(12) United States Patent
Watanabe

(10) Patent No.: US 7,466,557 B2
(45) Date of Patent: Dec. 16, 2008

(54) STORAGE DEVICE AND METHOD OF EFFICIENTLY ARRANGING COMPONENTS IN AN INFORMATION PROCESSING APPARATUS

(75) Inventor: Hayato Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 221 days.

(21) Appl. No.: 11/405,512

(22) Filed: Apr. 18, 2006

(65) Prior Publication Data

US 2006/0256515 A1  Nov. 16, 2006

(30) Foreign Application Priority Data

Apr. 18, 2005  (JP) .............................. 2005-120375

(51) Int. Cl.
 *H05K 5/00* (2006.01)
(52) U.S. Cl. .................. 361/752; 361/792; 361/684
(58) Field of Classification Search ................ 361/752, 361/790, 797, 800, 792, 684, 686
See application file for complete search history.

(56) References Cited

U.S. PATENT DOCUMENTS

| 5,831,821 | A | * | 11/1998 | Scholder et al. ............. 361/686 |
| 5,835,346 | A | * | 11/1998 | Albani et al. ................ 361/684 |
| 5,850,209 | A | * | 12/1998 | Lemke et al. ................ 345/156 |
| 5,963,431 | A | * | 10/1999 | Stancil ....................... 361/803 |
| 6,273,730 | B1 | * | 8/2001 | Chang ......................... 439/61 |
| 6,296,509 | B1 | * | 10/2001 | Leung et al. ................. 439/362 |
| 6,404,624 | B1 | * | 6/2002 | Jeong ........................ 361/683 |
| 6,462,940 | B1 | * | 10/2002 | Diaz et al. .................. 361/683 |
| 6,473,823 | B1 | * | 10/2002 | Kerrigan et al. ............. 710/301 |
| 6,478,390 | B2 | * | 11/2002 | Gan ......................... 312/223.2 |
| 6,538,903 | B1 | * | 3/2003 | Radu et al. .................. 361/818 |
| 2006/0139880 | A1 | * | 6/2006 | Tate .......................... 361/697 |
| 2006/0256515 | A1 | | 11/2006 | Watanabe |

FOREIGN PATENT DOCUMENTS

| JP | 11-031889 | 2/1999 |
| JP | 11-296258 | 10/1999 |
| JP | 2001-159931 | 6/2001 |
| JP | 2001-196759 | 7/2001 |
| JP | 2002-280766 | 9/2002 |

OTHER PUBLICATIONS

U.S. Appl. No. 11/623,502, filed Jan. 16, 2007, Watanabe.

* cited by examiner

*Primary Examiner*—Tuan T. Dinh
*Assistant Examiner*—Hung S Bui
(74) *Attorney, Agent, or Firm*—Oblon, Spivak, McClelland, Maier & Neustadt, P.C.

(57) ABSTRACT

An information processing apparatus designed for miniaturization, having a chassis, and including a motherboard; an expansion slot exchange device electronically connected to the motherboard and configured to hold an expansion card; and a memory device electronically connected to the motherboard and located within the chassis primarily in a first plane orthogonal to a primary plane of the motherboard. An expansion card can be added, occupying a plane parallel to the primary plane of the motherboard.

10 Claims, 6 Drawing Sheets

STORAGE DEVICE AND METHOD OF EFFICIENTLY ARRANGING COMPONENTS IN AN INFORMATION PROCESSING APPARATUS

BACKGROUND OF THE INVENTION

1. Field of the Invention

A storage device and method of efficiently arranging components in an information processing apparatus.

2. Discussion of the Background

Miniaturization of an information processing apparatus used as a personal computer or a server is desired for space savings. Miniaturization is also a highly desired feature for information processing devices which are installed within other, larger devices or within equipment racks because it is desirable for the larger devices or equipment racks themselves to be miniaturized.

JP2001-159931 discloses the use of a casing as radiator plate and loading a CPU, HDD apparatus, and other devices on or near to the casing for heat dissipation, thus removing the need for a cooling fan and therefore downsizing the computer. However this invention has a drawback that it is difficult to introduce an expansion card, which performs functions not included as standard equipment, to the computer due to the locations of CPU (6 and 36) and HDD apparatus (8 and 38).

SUMMARY OF THE INVENTION

The present invention provides a storage device and method of efficiently arranging components in an information processing apparatus that enables the importation of expansion cards and for miniaturization. In particular, an information processing apparatus designed for miniaturization, having a chassis, and including a motherboard; an expansion slot exchange device electronically connected to the motherboard and configured to hold an expansion card; and a memory device electronically connected to the motherboard and located within the chassis primarily in a first plane orthogonal to a primary plane of the motherboard. An expansion card can be added, occupying a plane parallel to the primary plane of the motherboard.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
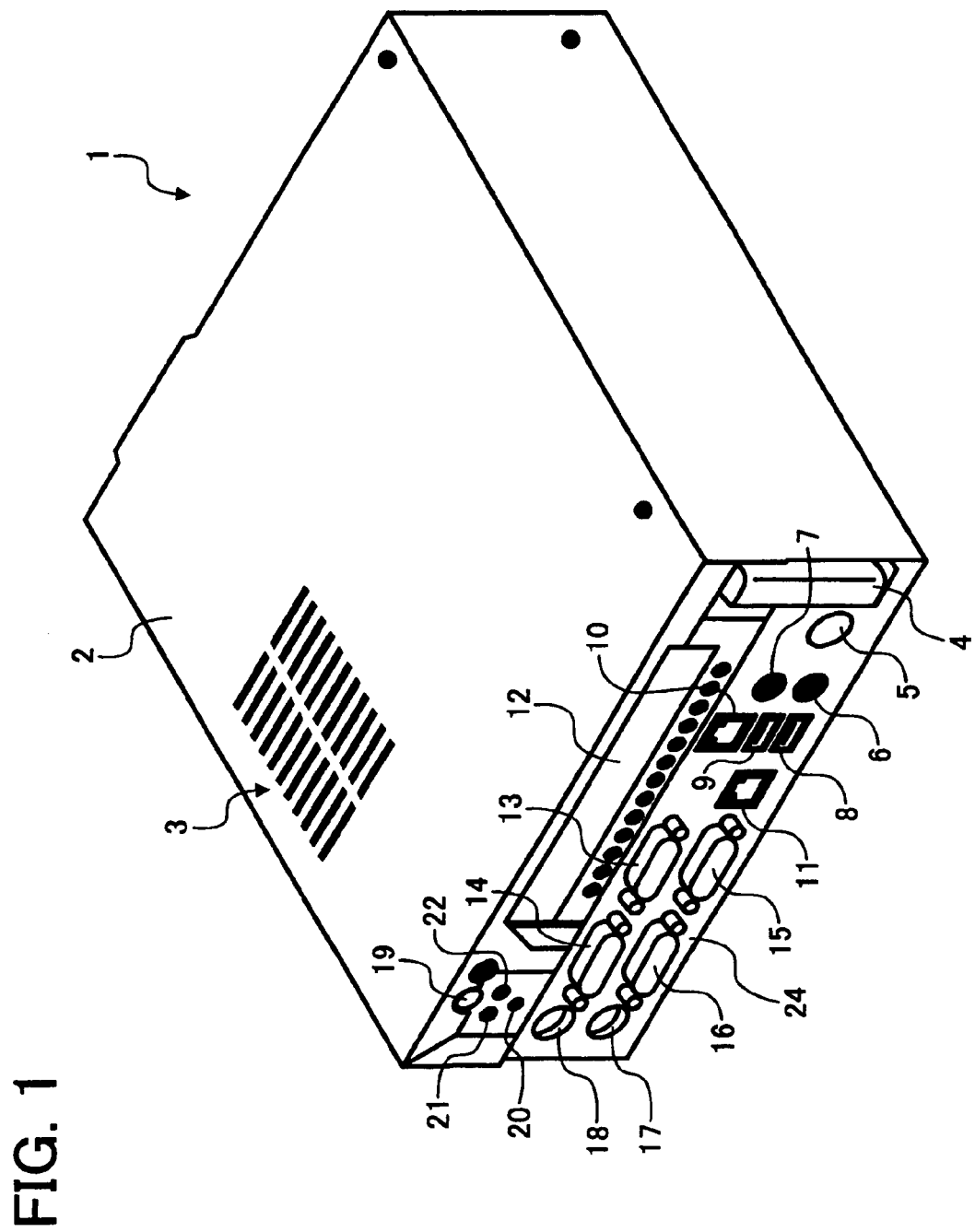
FIG. 1 shows an external view of one embodiment of an apparatus in accordance with the present invention.
Figure 2:
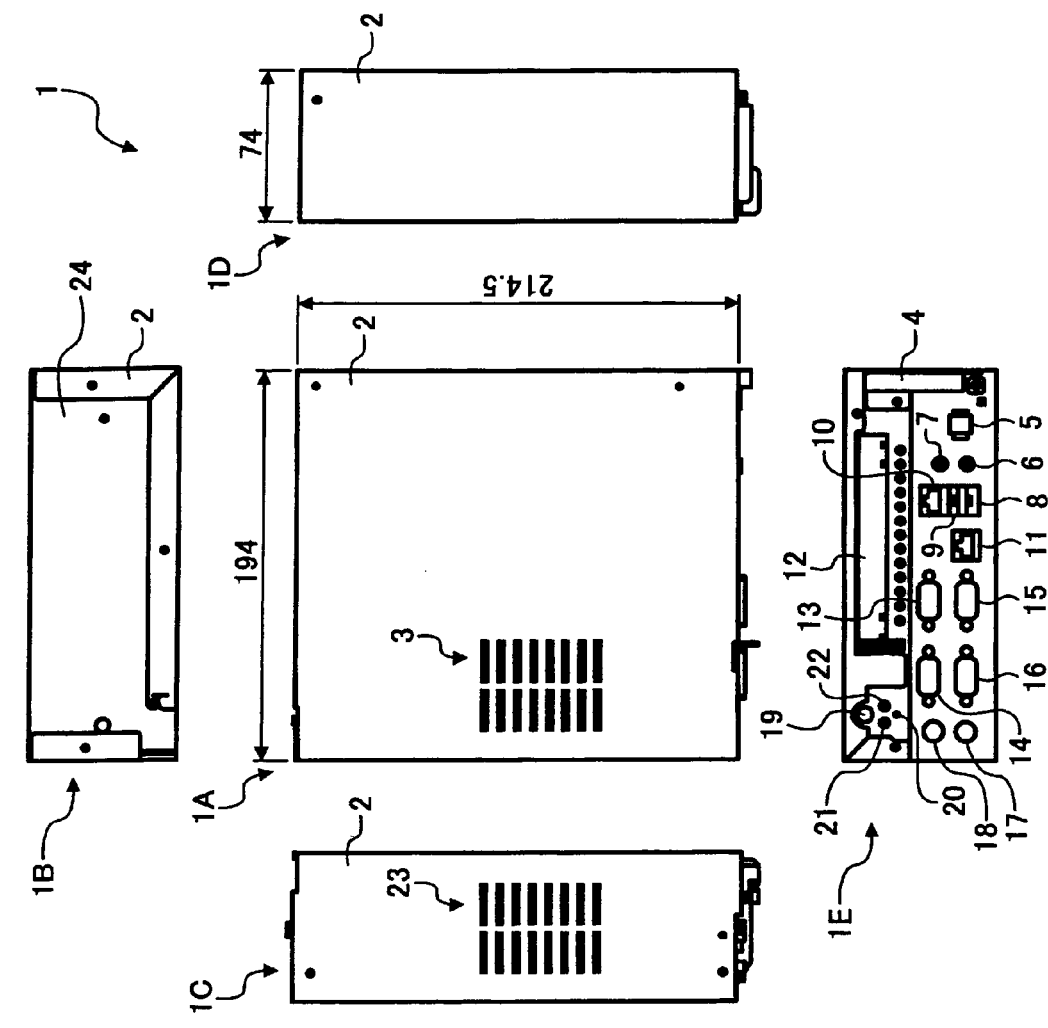
FIG. 2 shows a top plane view, a back view, a left side view, a right side view, and a front view of one embodiment of an apparatus in accordance with the present invention.

FIG. 1 is an external view of one embodiment of the present invention. FIG. 2 shows a top plane view 1A, a back view 1B, a left side view 1C, a right side view 1D, and a front view 1E of one embodiment of an apparatus in accordance with the present invention.

Referring to these figures, a chassis of an information processing apparatus 1 includes an upper cover 2 and a lower cover 24 made of sheet metal. In this embodiment, the information processing apparatus 1 is 194 mm wide, 214.5 mm long and 74 mm high. Airshafts 3 and 23 let out heat generated inside the chassis on the upper cover 2. Airshafts 3 and 23 are located near the CPU, which has the highest calorific value in the apparatus.

At the front of the information processing apparatus 1 is a lid 4 of a slot for CF (Compact Flash) card that is a removable recording medium. When the apparatus 1 is loaded with a CF card, the CF card stands out from the apparatus 1 by about 7 mm for easy removal. The lid 4 protects the card and prohibits accidental removal. Lid 4 also prevents foreign matters from entering the slot when CF card is not installed.

In addition, the following devices are located on the front surface of the apparatus 1: a connector 5, LINE OUT terminal 6, LINE IN terminal 7, USB(Universal Serial Bus) terminals 8 and 9, connectors for LAN (Local Area Network) 10 and 11, serial connectors 13, 14, and 15, an analog RGB terminal for display 16, a terminal for keyboard 17, a terminal for mouse 18, a power supply switch 19, a hole for resetting of the apparatus 1 20, a LED for power supply 21, a LED for HDD 22. A PCI slot 12 is located on the front surface of the apparatus 1 also. Placing the connectors and other devices on or near the front surface enables improved operational performance and greater flexibility of the information apparatus 1, particularly for embodiments that are later installed or to-be-installed within larger devices or within equipment racks.

Figure 3:
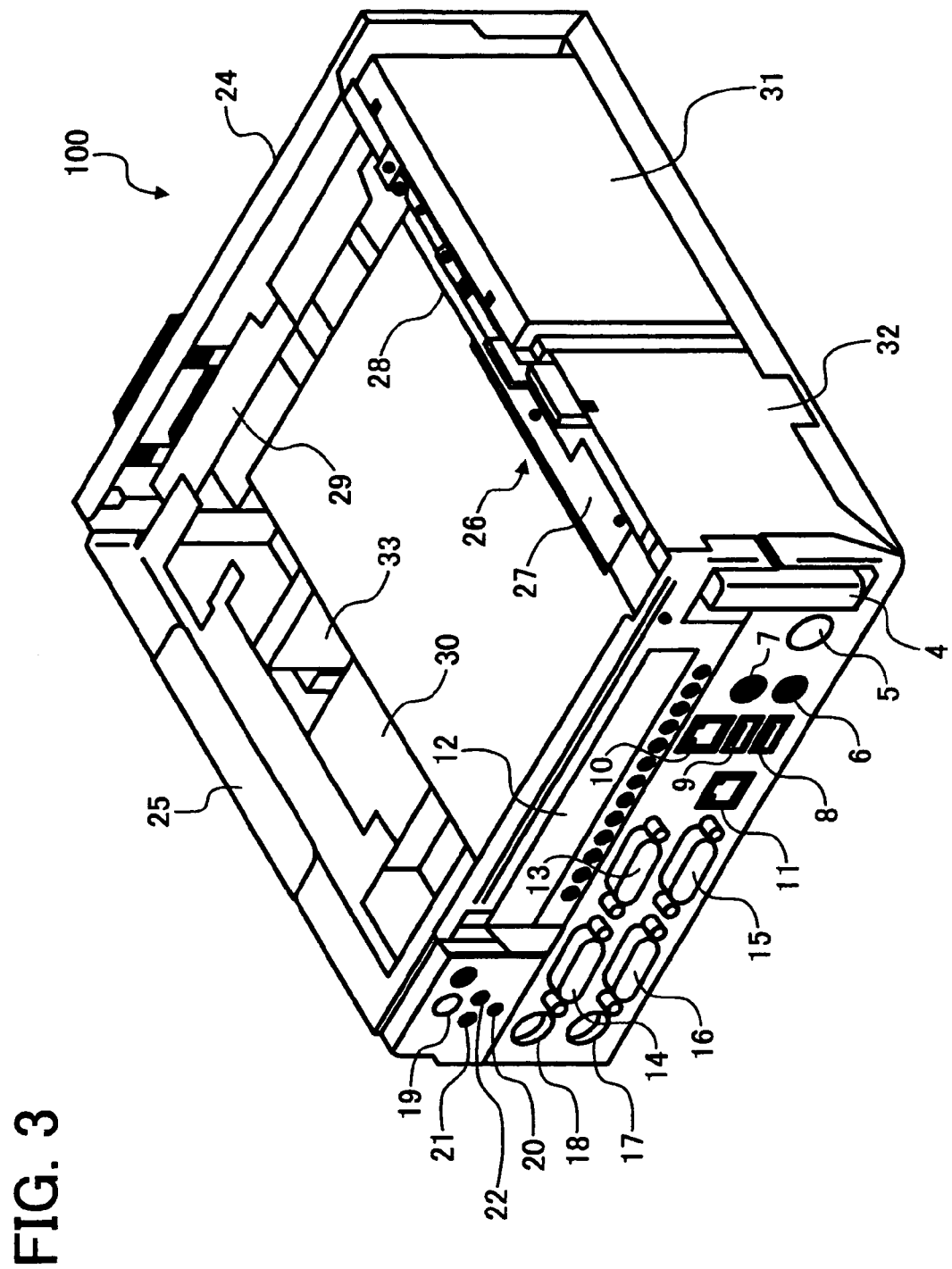
FIG. 3 is an internal view of the one embodiment of an apparatus detached the upper cover.
Figure 4:
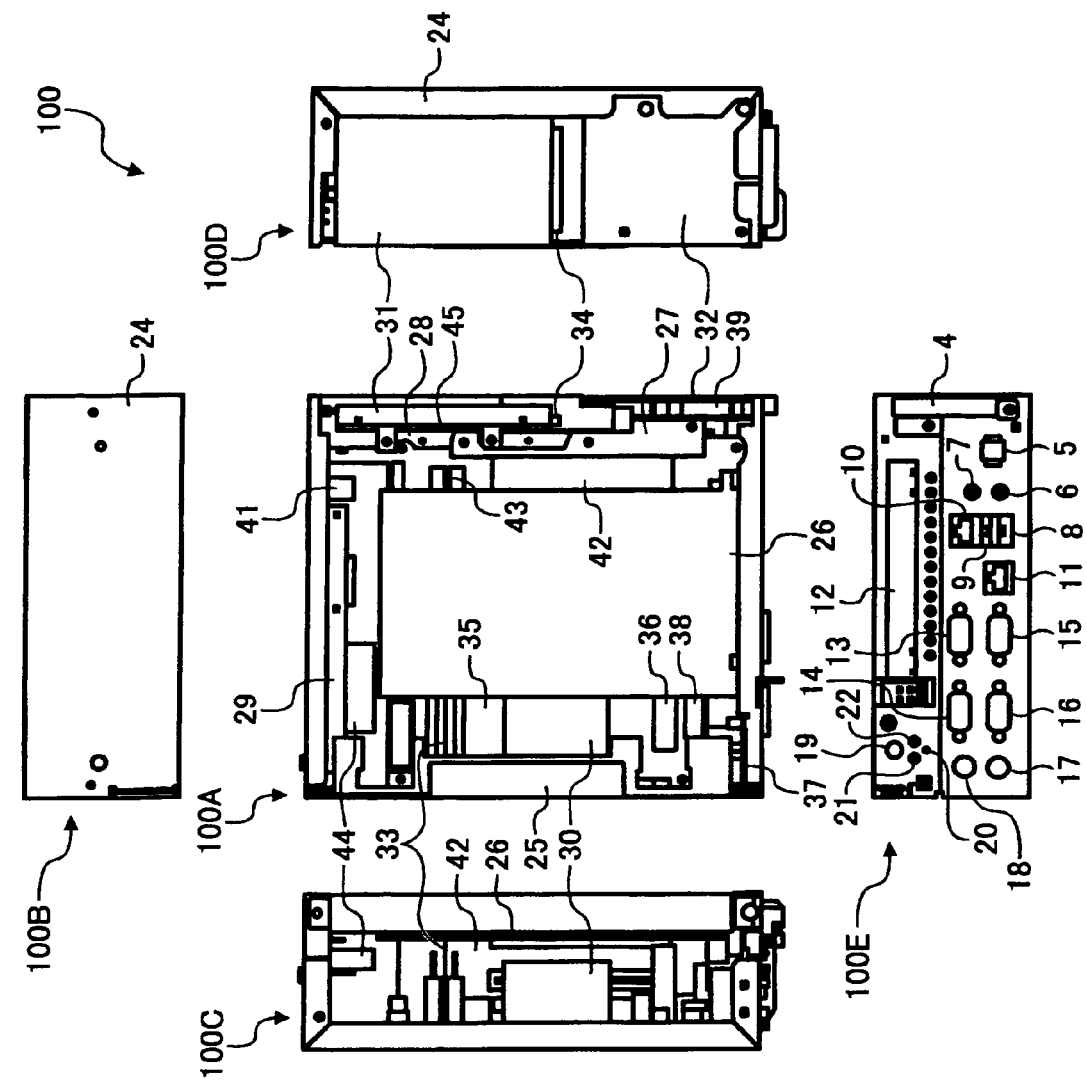
FIG. 4 shows a top plane view, a back view, a left side view, a right side view, and a front view of the information processing apparatus detached the upper cover.

FIG. 3 is an external view of the information processing apparatus 1 the upper cover 2 removed, which is numbered 100. FIG. 4 shows a top plane view 100A, a back view 100B, a left side view 100C, a right side view 100D, and a front view 100E of the information processing apparatus 1 in the same state.

The lower cover 24 covers the front plane, the bottom plane, and the back plane. Both of the side planes and the top plane are covered with the upper cover 2. A power supply switch and switchboard 37 is located on the side of the upper cover which comprises the front plane of the information processing apparatus 100. Support member 25 for supporting the apparatus is located on the left side of the upper cover 2 and inside of information processing apparatus 1.

The motherboard 35 and the DC/DC converter 29 are located on the lower cover 24. Support member 28 is made of a metal plate and is loaded on the lower cover 24 so as to create two spaces. Motherboard 35 is located in one of the divided spaces. HDD 31 as a memory device and board 32 (for a CF card) are located in the other of the divided spaces. A method of locating the supporting member 28 and HDD 31 is described below.

The connector 39 for the CF card is on board 32. The attachment of the CF card, via a card terminal, to connector 39 enables read/write information for CF card.

The heat sink 30 for CPU is located on motherboard 35. The heat sink 30 helps to dissipate heat generated from a CPU (not shown). Connector 36 supplies power to the motherboard. The other connector 38, memory 33 (for primary storage_, and a clamp 43 are located on the motherboard 35 also. The memory 33 is held by the clamp 43. In addition, a riser card 42 is located on the motherboard 35. The riser card 42 serves as an expansion slot exchange device for adjusting the direction of installed PCI (Peripheral Component Interconnect) card 26 by 90 degrees. PCI card 26 serves as an expansion card.

The riser card 42 is fixed to the support member 28 with a riser bracket 27 located to the support member 28. This fixing prevents the installed PCI card 26 from being unsteady. The PCI card 26 is installed to according to the following steps: detach the upper cover 2; insert the PCI card 26 to a lodging slot on the riser card 42 by sliding from one side to the other side; closing the upper cover 2.

PCI card 26 is oriented parallel with the motherboard 35. This orientation enables a reduction of the thickness of information processing apparatus 1 and a miniaturization of the apparatus as compared to conventional configurations where the PCI card is installed directly onto the motherboard in direction orthogonal to the plane of the motherboard. That is, PCI card 26 is located within a chassis primarily on a plane parallel to a primary plane of the motherboard, where the primary plane of the motherboard is the largest plane subtended by the motherboard and is the plane onto which most components are mounted.

The DC/DC converter 29 has a connector 41 for inputting power supply from a power supply connector 5 through a conductor. This conductor (cable) is oriented so as to pass between the riser card 42 and the support member 28. This orientation enables the cable to be seated in a position that secure from entanglement or damage.

In addition, DC/DC converter 29 has a connector 44 to supply converted voltage to motherboard 35. The connector 36 on the motherboard is supplied power from the connector 44 through a cable (not shown). This cable is oriented so as to pass through a space of the support member 25. This space is rectangular with one side open. This orientation allows for supplying power without contacting other members, for example the heat sink 30 for the CPU and the memory 33. Consequently, air heated by the CPU can be exhausted toward airshafts 3 and 23 without inhibition by the cable. The identical effect is achieved in the case where the information processing apparatus is positioned so that the right side view ID (100D) is a bottom face of the information processing apparatus 1.

Figure 5:
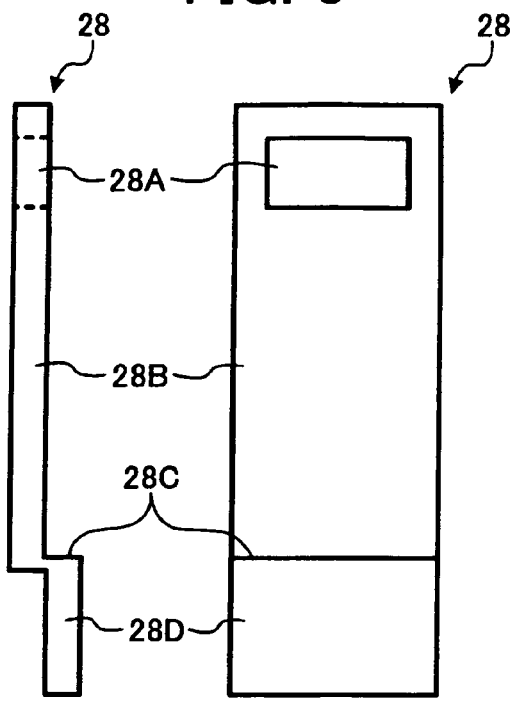
FIG. 5 is a schematic diagram for explaining the support member used in one embodiment of an apparatus in accordance with the present invention.

FIG. 5 is a schematic diagram of support member 28. The left figure is an overhead view, and right figure is a right side view of the support member 28. The support member 28 includes a hole 28A for passing through cables which connect a) the HDD 31 and motherboard 35 and b) board 32 for the CF card and motherboard 35, respectively. Referring to FIG. 5, support member 28 has two-tired structure so as to narrow the space needed for the CF card. The reasons for the choice of structure are the following: to be tailored to the thickness of the CF card that is thinner than the HDD 31, to guide the CF card to the connector 39 smoothly along the support member 28D, and to make it harder for foreign matters to get into the CF card or slot.

Figure 6:
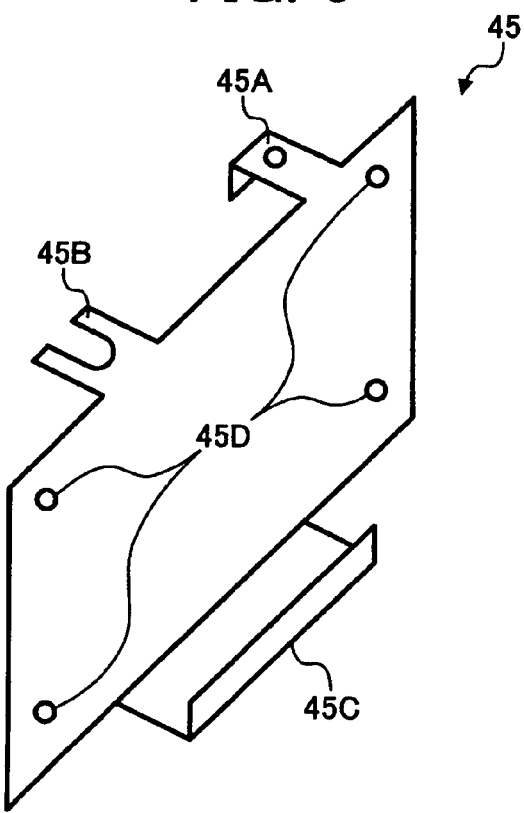
FIG. 6 is a schematic diagram for explaining the adjustment member used in one embodiment of an apparatus in accordance with the present invention.

The HDD 31 is a 2.5-inch disk, and is supported by the support member 28 through adjustment member 45 (made from steel or other metal plate). FIG. 6 shows the adjustment member 45. The adjustment member 45 has a main body part made from steel plate, a screw clamp 45A having a claw for hooking the support member 28, a screw clamp 45B, a turndown part 45C for adjusting the gap between the lower cover 24, and screw clamps 45D for screwing with the adjustment member 45 to the HDD 31. A part of the screw clamp 45B is open so as to be screwed shut with a lot of flexibility.

Figure 7:
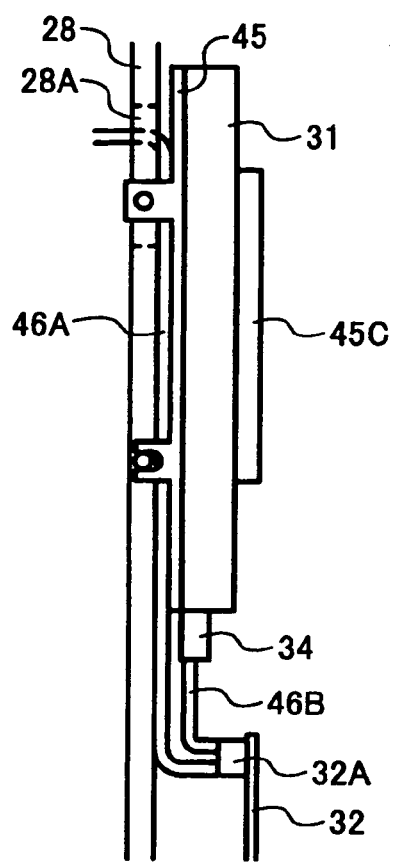
FIG. 7 shows the first method of locating the HDD to the apparatus.

FIG. 7 shows a first method of locating the HDD 31 to the apparatus 1 with the adjustment member 45.

The HDD 31 exchanges data using a 2.5-inch IDE (Integrated Drive Electronics) cable. First, HDD 31 is fixed to the adjustment member 45 (e.g., with a screw clamp). In this configuration, connector 34 is oriented to face the front of the apparatus.

IDE cable 46A from the motherboard 35 passes thorough the hole 28 formed on the support member 28, and is connected to the connector 32A located on the board 32 for CF card. This connection enables read and write operations for the CF card. IDE cable 46B, from the connector 32A, and the connector 34 of the HDD 31 are connected in series. In addition, the adjustment member 45 and the support member 28 are screwed shut with the adjustment member 45 hooked on the support member 28 so that the IDE cable 46A is nestled between the two members.

The above method of locating has the following advantages. Holding the cable 46 between the support member 28 and the adjustment member 45 enables to reduce EMI (Electro Magnetic Interference), i.e. noise. Also, IDE cable 46A operates as a cushion to reduce vibration to the fragile HDD 31 (removing the need for a single purpose device vibration reduction device). In addition, when the IDE cable is connected to another cable, it is preferable that the length of IDE cable 32 be short for reduced reflections between terminal ends thus providing for more stable communication of data.

In the above embodiment, the HDD 31 is located so that the connector 34 for the HDD 31 is on the side of the board 32 for the CF card. This orientation enables a shortening of the length of the IDE cable 32 after the connector 32A, and allows for stable communication from the HDD 31 due to reduced signal reflections. Furthermore, locating the HDD 31 near to the side face of the apparatus 1 allows heat generated from the HDD 31 to radiate through the lower cover 24 or the upper cover 2 (removing the need for a cooling device). Also, the face defined by the shortest side of the apparatus 1 is parallel with the installation surface of the motherboard 35. In other words, HDD 31 is located in a plane orthogonal to the motherboard 35. This orientation makes possible a narrower width of the apparatus 1. Also, the disk face of HDD 31 is parallel with the side face of apparatus 1.

With the preceding configuration, the connector 34 for the HDD 31 is located on the surface perpendicular to the installation surface of the motherboard 35. The overall configuration makes possible a shorter width of the apparatus 1 in the direction corresponding to the width of the HDD 31. Moreover, the HDD 31 is located on the opposite side of the motherboard 35 from the support member 28. In other word, support member 28 is located within the chassis between HDD 31 and riser card 42. This orientation allows for easy installation and removal of the HDD 31, and reduces the depth of the apparatus 1 by overlapping the HDD 31 and the riser card 42.

In summary, the device includes a chassis, a motherboard 31; an expansion slot exchange device (e.g., riser card 42) electronically connected to the motherboard and configured to hold an expansion card (e.g., PCI card); and a memory device (e.g., HDD 31) electronically connected to the motherboard, wherein the memory device is located within the chassis primarily in a first plane orthogonal to a primary plane of the motherboard. The expansion slot exchange device (e.g., riser card 42) is located within the chassis primarily in a second plane orthogonal to the primary plane of the motherboard. The expansion slot exchange device (e.g., riser card 42) is configured to hold the expansion card so that a primary plane of the expansion card is located in a plane parallel to the primary plane of the motherboard. A profile of said primary plane of said expansion card does not extend beyond a profile of said primary plane of said motherboard. A support member 28 is located within the chassis primarily in a third plane orthogonal to the primary plane of the motherboard and is configured to support the memory device and to hold the expansion slot exchange device. The third orthogonal plane is between said first and second orthogonal planes. The memory device and the expansion slot exchange device at least partially overlap in a direction parallel to the primary plane of said motherboard.

Figure 8:
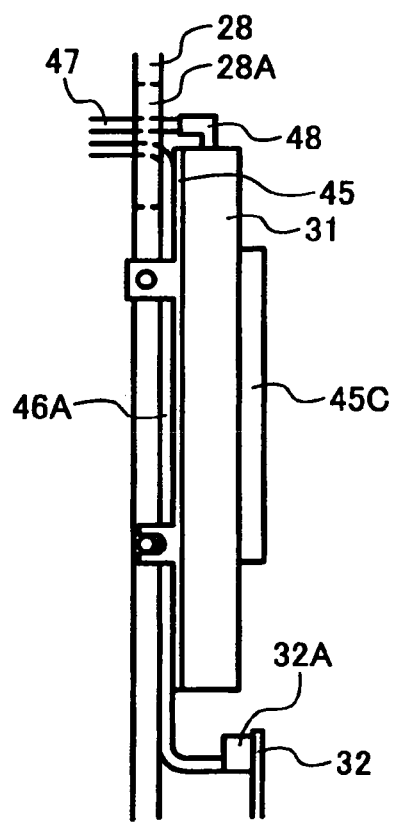
FIG. 8 shows another method of locating the HDD to the apparatus.

FIG. 8 describes another method of locating a HDD 31, which exchanges data through serial ATA (AT Attachment), to the apparatus 1.

First, the HDD 31 is fixed with screwed clamp with adjustment member 45 so that that a connector 34 faces the back surface of the apparatus in contradiction to the case described with referring to FIG. 7. Cable 47 for serial ATA is connected to the HDD 31. The cable 47 for the serial ATA connects to the HDD 31 via an L-shaped connector 48. This connection enables communication between the motherboard 28 and the HDD 31.

Adjustment member 45 and the support member 28 are screwed shut with the adjustment member 45 hooked on the support member 28 in order that the IDE cable 46A is nestled between the two members. As previously mentioned, the above method of locating has the following advantages, that is reducing of electron-magnetic interference (EMI), reducing vibrations, radiating heat through upper and lower cover, reducing width, depth and height, and facilitating installation/ removal of the HDD 31. In addition, this configuration allows for connecting the HDD 31 and the serial ATA cable 47 in the region near to the hole 28A which perforates the support member 28, and enables to shorten the cable.

According to the above explained embodiments, the PCI card used as an expansion card is located on the motherboard 35 such that the PCI card is parallel with the motherboard 35, and the HDD 31 is oriented such that the disk face of the HDD 31 is parallel with the side face of the apparatus 1. Consequently it is possible to eliminate wasted space of the apparatus 1 and to downsize the apparatus 1.

In the above-explained embodiments, an example that the CF card is used as a portable recoding medium is described. However, it is not limited to this. Other semiconductor memory, an optical disk, and a magnetic optical disk can be oriented within a processing apparatus in the same manner. In addition, a portable hard disk drive can be arranged within a processing device in a similar manner.

In another embodiment, board 32 for the CF card, connector 39 and lid 4 of a slot for CF card may be reoriented located in the case where a portable recording medium is not in use. In this instance, the HDD 31 can be located on the side of the back face of the apparatus 1 and DC/DC converter 29 is located on the side face of the apparatus 1.

Furthermore, in the above-explained embodiments, support member 28 divides the space for locating the motherboard 35 and the space for locating the HDD almost completely. However, the support member 28 just has to have enough length to hold the HDD 31 or other secondary memory device, so it does not need to divide into two the space for locating the motherboard 35 and the space for locating the HDD completely. In this case, when a portable recording medium is used, it is only necessary to install a special guide (not shown) for inserting the medium.

In the above explained embodiments, an example that the 2.5-inch HDD is used as a HDD 31 is described. However, HDD 31 can be another size disk. When a disk is smaller than a 2.5-inch disk is used, it is possible to reduce the height of the apparatus 1 to less than 74 mm as described in the above embodiments. And the HDD 31 can be located on the other side of the support member 28, where the motherboard 35 rests. In this embodiment, lower cover 24 fulfills the role of the support member 28 (not shown). On the contrary, where a disk larger than 2.5-inch disk is used, it is possible to load a plural expansion cards though the height of the apparatus 1 increases (not shown).

In the above embodiments, HDD 31 is used as a secondary memory device. However, a semiconductor memory or an optical memory may also be used as a secondary memory device.

In the above embodiments, PCI card 26 is used as an expansion card. However, plural cards like the PCI card 26 may be used, though the height of apparatus 1 may be adjusted.

In the above embodiments, PCI card 26 is loaded on the motherboard 35. However, PCI card 26 may also be located underneath the motherboard 35. In this configuration, as long as the PCI card 26 is parallel with the motherboard 35, it is possible to reduce the height of the apparatus 1 in a manner similar to the previous embodiments.

The above-described embodiments are intended to illustrate the present invention, not to limit the scope of the present invention. Other than the disclosed embodiments, various embodiments and various usages will become apparent to those skilled in the art upon studying the above-described embodiments. The scope of the present invention is shown by the attached claims rather than the embodiments. Various modifications made within the meaning of an equivalent of the claims of the invention and within the claims are to be regarded to be in the scope of the present invention.

While the present invention has been described with a preferred embodiment, this description is not intended to limit the scope of the invention. Various modifications of the embodiment will be apparent to those skilled in the art. It is any such modifications or embodiments as fall within the true scope of the invention.

This application is based on Japanese Patent Application No. 2005-120,375 filed on Apr. 18, 2005 and including specification, claims, drawings and summary. The disclosure of the above Japanese Patent Application is incorporate herein by reference in its entirety.

The invention claimed is:

1. An information processing apparatus having a chassis, comprising:

a motherboard;

an expansion slot exchange device electronically connected to said motherboard and configured to hold an expansion card so that a primary plane of said expansion card is located in a plane parallel to the primary plane of the motherboard and a profile along said primary plane of said expansion card does not extend beyond a profile along said primary plane of said motherboard, said expansion slot exchange device being located within said chassis primarily in a first plane orthogonal to the primary plane of the motherboard;

a memory device electronically connected to said motherboard and disposed within said chassis primarily in a second plane orthogonal to the primary plane of the motherboard; and a support member located within said chassis primarily in a third plane orthogonal to the primary plane of said motherboard and configured to support said memory device and to hold said expansion slot exchange device, said third orthogonal plane between said first and second orthogonal planes, wherein said memory device and said expansion slot exchange device at least partially overlap in a direction parallel to the primary plane of said motherboard.

2. The apparatus of claim 1, wherein said memory comprises:
a terminal configured to electrically connect said memory to said motherboard, wherein
said terminal is configured to face to a direction parallel to the primary plane of said motherboard.

3. The apparatus of claim 1, further comprising:
a metal plate; and
a cable connected to said motherboard, wherein
said support member is made of metal,
said memory is supported by said support member through the metal plate, and
said cable is positioned between said support member and said memory.

4. The apparatus of claim 1, wherein said expansion card is a PCI card.

5. The apparatus of claim 1, wherein said memory is a 2.5-inch hard disk drive.

6. The apparatus of claim 1, wherein the support member comprises:
a two-tier structure including a first tier larger than a second tier, the first tier including a through-hole configured to enable the passage of a cable.

7. The apparatus of claim 1, further comprising:
a riser bracket configured to connect the expansion slot exchange device to the support member.

8. The apparatus of claim 1, further comprising:
an adjustment member configured to connect the memory device to the support member.

9. The apparatus of claim 8, wherein said adjustment member comprises:
a main body part;
a screw clamp having a claw configured to hook the support member;
a turndown part for adjusting a gap between said adjustment member and a lower cover; and
a screw clamps for screwing the adjustment member to the memory device.

10. An information processing apparatus having a chassis, comprising:
a motherboard within said chassis and having a primary plane;
a memory device in a first plane orthogonal to the primary plane of said motherboard;
in a second plane orthogonal to said primary plane of said motherboard, means for holding an expansion card so that a primary plane of said expansion card is located in a plane parallel to the primary plane of the motherboard and a profile along said primary plane of said expansion card does not extend beyond a profile along said primary plane of said motherboard; and
in a third plane orthogonal to said primary plane of said motherboard, means for supporting said memory device and for holding said means for holding an expansion card, said first, second and third planes being different from each other, said memory device and said expansion slot exchange device at least partially overlapping in a direction parallel to the primary plane of said motherboard.

* * * * *